United States Patent [19]

Hood, II

[11] 3,843,159
[45] Oct. 22, 1974

[54] FIFTH WHEEL SLIDER SUPPORT
[75] Inventor: Charles N. Hood, II, Deerfield, Ill.
[73] Assignee: Amstead Industries Incorporated, Chicago, Ill.
[22] Filed: Oct. 19, 1973
[21] Appl. No.: 408,194

[52] U.S. Cl.................... 280/407, 188/67, 188/170
[51] Int. Cl............................................. B62d 53/06
[58] Field of Search................ 280/407, 433, 438 R; 188/67, 170, 96 P, 79.5 GT

[56] References Cited
UNITED STATES PATENTS

| | | | |
|---|---|---|---|
| 2,317,508 | 4/1943 | Zoder | 280/407 |
| 2,579,305 | 12/1951 | Cushman | 188/67 X |
| 2,713,500 | 7/1955 | Flynn | 280/407 |
| 2,951,560 | 9/1960 | Smellie | 188/67 X |
| 3,498,635 | 3/1970 | Braunberger | 280/407 |
| 3,584,899 | 6/1971 | Gottler | 280/407 |

Primary Examiner—Leo Friaglia
Assistant Examiner—Randall A. Schrecengost

[57] ABSTRACT

A fifth wheel slider support for mounting a fifth wheel on the frame of a semi-trailer. The slider support includes guide bars slidably supporting carrier blocks on which the fifth wheel is mounted. Lock washers disposed about the guide rods are resiliently urged to a locked position and retain the carrier blocks in a selective lengthwise position on the support. Pneumatic-mechanical latch means releases the lock-washers to permit lengthwise positioning of the carrier blocks.

9 Claims, 4 Drawing Figures

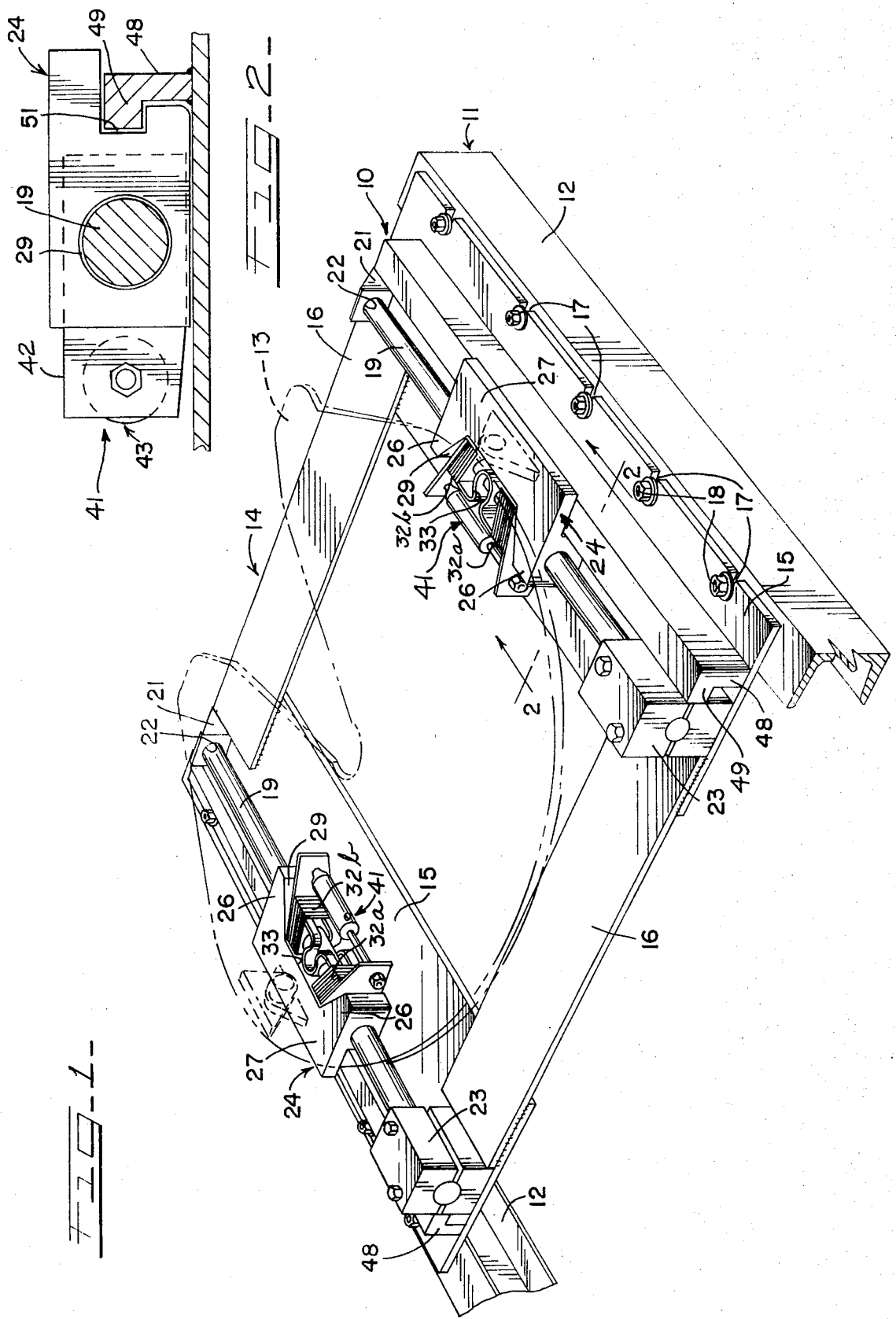

FIFTH WHEEL SLIDER SUPPORT

BACKGROUND AND SUMMARY OF INVENTION

The present invention relates to fifth wheels used to attach a semi-trailer to a tractor and more particularly to an improved fifth wheel slider support for mounting the fifth wheel on the tractor frame.

It is frequently desired to selectively position the fifth wheel lengthwise on the tractor frame to accommodate different coupling conditions. To this end, the fifth wheels are mounted on longitudinally adjustable slider supports that are fastened to the tractor frame.

Heretofore, the fifth wheel slider supports have usually used a positive locking arrangement including either a pin inserted in one of a plurality of lengthwise spaced holes or a form of tapered wedge engageable with a rack. Straight pins insertable into straight holes are economical to manufacture but difficulties are encountered in maintaining a tight slack-free fit. Loosening of pins in the openings and the resulting slack is particularly prevelant as a result of wear caused by repeated insertion and removal of the pin or wear caused by the stresses imposed on the pins by the forces associated with the semi-trailer hitched to the fifth wheel. While tapered pins or wedges are more satisfactory in achieving a slack-free fastening and are capable of accommodating reasonable wear, these fastening arrangements are more expensive to manufacture.

Moreover, both of the above generally described prior arrangements are limited to adjustment in discreet increments, dependent on the spacing of the holes or rack teeth. The discreet incremental spacing limits the lengthwise adjustment to the spacing used and does not permit the adjustment to points intermediate the spacing.

Moreover, coupling requirements of the semi-trailer with the fifth wheel dictate that the combined height of the fifth wheel and slider support above the frame be maintained at a minimum height. Heretofore, to achieve such a minimum height or profile the fifth wheel mounting structure has frequently been disposed about the fifth wheel. These structures have generally been complex and expensive to manufacture.

By the present invention it is proposed to provide a mounting structure for adjustably positioning the fifth wheel lengthwise on the frame which overcomes the difficulties encountered heretofore and which are economical to manufacture.

This is accomplished generally by the provision of a fifth wheel mounting structure comprising a base on which there is fixed a pair of longitudinally and laterally spaced guide rods. The guide rods slidably support carrier blocks on which the fifth wheel plate is adapted to be mounted. Lock washers are mounted on the guide rods and are engageable with the carrier blocks. The lock washers are tiltable on the guide rods between a locked position which resists lengthwise movement of the carrier blocks on the rods and an unlocked position in which the carrier blocks are slidable along the rods. Resilient means are provided for urging the lock washers to the locked position whereby the carrier blocks are locked against lengthwise movement on the guide rods.

A further feature of the invention is the provision of a latch means for applying an opposing force for overcoming the urging force of the resilient means thereby to move the lock washers to the unlocked position so that the carrier blocks are slidable and selectively positionable along the length of the guide rods.

Further features of the invention will hereinafter appear.

BRIEF DESCRIPTION OF THE DRAWINGS

FIG. 1 is a perspective view of the fifth wheels mounting structure attached to the frame of a tractor and with the fifth wheel mounted thereon shown in phantom.

FIG. 2 is an enlarged cross sectional view taken generally along the line 2—2 of FIG. 1.

DESCRIPTION OF THE PREFERRED EMBODIMENT

Figure 3:
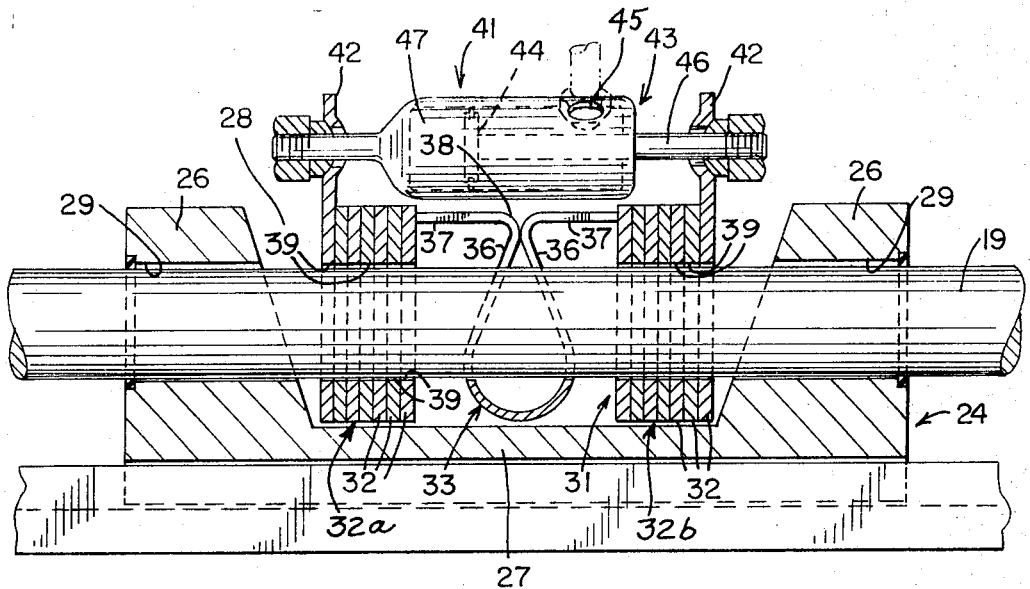
FIG. 3 is a fragmentary view partially in cross section of the carrier block mounted on the guide rod with the lock washers shown in the unlocked position.

Referring now to the drawings the fifth wheel support 10 embodying the structure of the present invention is shown mounted on the frame 11 of a tractor of the type used to haul semi-trailers. The frame 11 includes a pair of laterally spaced beams 12.

The fifth wheel support 10 on which the fifth wheel 13 is mounted includes a base 14 which may be made as a weldment having laterally spaced side base plates 15 which are joined by welding at the opposite ends to lengthwise spaced end base plates 16. The side base plates 15 are provided with lengthwise spaced openings 17 which accommodate bolts 18 to fix the base 14 on the beams 12 of the tractor frame 11.

A pair of longitudinally extending guide rods 19 are mounted on each of the base sides plates 15. A bracket 21 fixed on one end of the base 14 receives one end of the guide rod 19 in a recess 22. The other end of the guide rod 21 is clamped against lengthwise movement and rotation by a split clamp 23 fixed to the opposite end of the base 14.

Carrier blocks 24 are slidably supported on the guide rods 19 and provide a support for the fifth wheel 13. As shown the carrier block 24 is generally C-shaped including a pair of lengthwise spaced legs 26—26 extending from the opposite ends of a longitudinally extending body 27. The legs 26—26 define a cavity 28 in the body 27. The guide rod 24 extends through aligned openings 29—29 in the legs 26—26 and through the cavity 28. The carrier blocks 24 are thus each slidable lengthwise of the associated rods 19 so that the fifth wheel 13 mounted thereon may be adjustably positioned relative to the tractor frame 11.

Figure 4:
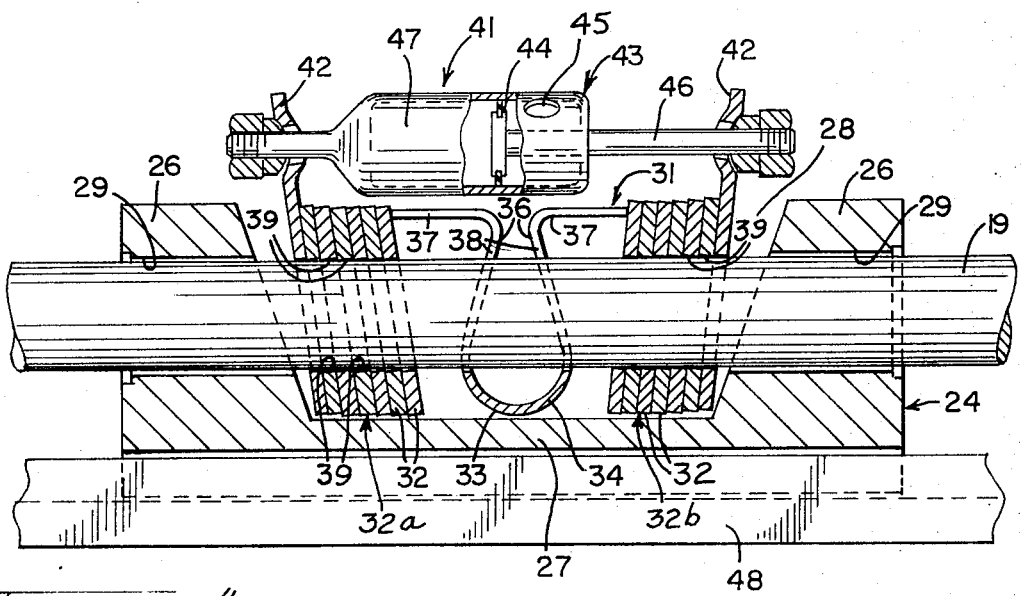
FIG. 4 is a view similar to FIG. 3 but with the lock washers shown in the locked position.

Lock means 31 are provided for locking the carrier blocks 24 in a selected adjusted position. As shown in FIGS. 3 and 4 the lock means 31 includes a plurality of lock washers 32 slidable on the guide rods 21 and engageable with the carrier block 24 within the cavity 28. The lock washers 32 when tilted or cocked to the position shown in FIG. 4 are restrained and locked against sliding action along the rods and when in the position shown in FIG. 3 generally normal to the axis of the rod are unlocked and freely slidable.

Resilient means 33 is disposed between the lock washers 32 to divide the latter into groups 32a and 32b of equal number and is operative to urge or bias the groups 32a and 32b to the lock position shown in FIG. 4. The resilient means 33 is in the form of a U-shaped leaf spring having a bight 34 and a pair of legs 36 which each terminate in approximately right angular feet or projections 37. Slot 38 extends from the projections 37 and into each of the legs 36. The spring 33 is mounted on the guide rod 19 with the latter disposed in the slot 38. The spring 33 is thus slidable along the length of the rod 19.

The projections 37 of the spring 33 engage one side of the washers 32 to tilt or cock the latter to an angular position relative to the longitudinal axis of the guide rod 19. This causes the edges of the periphery defining the washer openings 39 in the lock washers 32 to grip and bite into the circumference of the guide rod 19. Such gripping and biting increases the frictional contact with the rod surface sufficiently to restrain further lengthwise movement of the lock washers 32 along the length of the rod 19. As clearly shown in FIG. 4, the spring 33 is operative to urge the lock washer group 32a in the opposite direction from the group 32b thereby to lock the washers against movement in either direction along the length of the guide rod 19. In this manner the lock washers 32 confined between the carrier block legs 26 are operative to lock the carrier blocks 24 fixed against lengthwise movement. In this connection it should be noted the groups 32a and 32b are tilted in the same direction as the direction of the buff and draft forces, respectively, imposed thereon by a semi-trailer coupled to the fifth wheel 13. Thus, the group 32a more firmly grip the guide rod 19 to resist movement of buff forces and the group 32b more firmly grip the rod 19 to resist movement of the draft forces.

Latch means 41 for unlocking the lock washers 32 is provided to overcome the urging force of the spring 33. As shown, the latch means 41 is a mechanical-pneumatic structure and comprises a pair of levers 42 loosely slidably mounted on the guide rod 19 and located at opposite ends of the groups 32a and 32b of lock washers 32. The levers 42 project above the washers 32 and provide force receiving ends to which a force may be applied to cause the lock washers 32 to be positioned substantially normal to guide rod 19 as shown in FIG. 3.

A pneumatic force means 43 is attached across the force applying ends of the levers 42. The pneumatic force means 43 includes a piston 44 having a piston rod 46 fixed to one of the release levers 42. The piston 44 is slidable within a cylinder 47 which is attached to the other of the levers 42. The cylinder 47 is provided with an aperture 45 through which the pneumatic pressure is adapted to be introduced to actuate the piston 44. Upon introduction of the pressure the piston 44 and cylinder 47 move relative to each other to cause the levers 42 to move from the tilted position shown in FIG. 4 to the parallel position shown in FIG. 3. The force is transmitted to the groups of lock washers 32a and 32b by the levers 42 so that the force of the spring 33 is overcome and the lock washers 32 are retained in a vertical position in which they are freely slidable on the guide rod 19. Suitable stop means are provided for preventing the lock washers 32 from tilting in the opposite direction. In the embodiment shown the left and right legs 36 of spring 33 contact each other in the unlocked position and may thus serve as over-travel stop means to prevent tilting of the washers in the opposite direction. In this manner the lock washers 32 are moved to the unlocked position by the combination of the pneumatic operation of the piston-cylinder 44–47 and the lever action of the levers 42.

In the unlocked position of the washers 32, the carrier blocks 24 are free to be moved lengthwise of the guide rods 19 to a desired position. Thereafter, the source of pneumatic power may be removed from the cylinder 47. The spring 33 is then operative to urge the lock washers 32 to the tilted locked position whereby the carrier blocks 24 are also locked against movement and maintained in the desired position.

Located adjacent the guide rods 19 and fixed to the side base plate 15 is a guide track 48 having a guiding ledge 49. The guiding ledge 49 is slidably received in a groove 51 in the side of the block. The slidable engagement of the ledge 49 in the groove 51 prevents turning of the carrier blocks about the guide rods 19 and transmits vertical and lateral loads to the base 15.

It should be understood that the arrangement described above constitutes the preferred embodiment and that many adaptations and modifications may be made without departing from the spirit of the invention.

What Is Claimed Is:

1. A slider support for mounting a load carrying member on the frame of a highway vehicle, said support comprising a base adapted to be attached to said frame, laterally spaced and longitudinally extending guide rods mounted on said base, carrier blocks having means to support an associated fifth wheel, said blocks mounted for lengthwise movement on respective guide rods, a plurality of lock washers slidable on each of said guide rods and engageable with one of said carrier blocks, said lock washers being tiltable on said guide rods between a locked position resisting lengthwise movement on said guiding rods and an unlocked position permitting sliding movement on said guiding rods, and resilient means disposed between said lock washers to divide said lock washers into groups and operative to urge said groups of lock washers to said locked position to resist buff and draft forces imposed on said member whereby said carrier blocks in engagement therewith are locked against lengthwise movement of said guide rods.

2. The invention as defined in claim 1 wherein latch means for applying opposing force means are mounted on said rod for opposing and overcoming said urging force of said resilient means to move said lock washers to said unlocked position whereby said carrier blocks are movable lengthwise of said guide rod means.

3. The invention as defined in claim 2 wherein said latch means includes pneumatic operated piston means and lever means.

4. The invention as defined in claim 1 wherein restraint means are mounted on said base parallel to said guide rods and engageable with said carrier blocks for restraining said carrier blocks against turning about said guide rod means and transmitting vertical and lateral loads to said base.

5. The invention as defined in claim 1 wherein each of said carrier blocks is provided with a cavity and said lock washers are disposed in said cavity.

6. The invention as defined in claim 5 wherein said carrier blocks each includes a pair of longitudinally spaced legs, said legs defining said cavity and said legs are provided with openings slidably accommodating said guide rod.

7. The invention as defined in claim 6 wherein said resilient means comprises a substantially U-shaped spring defined by a bight and a pair of legs, slot means in said legs for accommodating said guide rods whereby said spring is slidable along the length of said lock with said carrier block, and longitudinally extending projections on said legs engaging and urging said lock washers to said lock position.

8. The invention as defined in claim 7 wherein said lever means comprises a pair of levers slidably mounted on said guide rod to engage the opposite end ones of said plurality of lock washers, and said pneumatic means is connected to said outer ends of said levers so that upon relative constraction of said piston and cylinder said levers are operative to overcome said resilient means and said groups of lock washers on opposite sides of said resilient means are moved to said unlocked position.

9. In a slider support for a load carrying member on the frame of a highway vehicle; the combination of a guide rod adapted to extend longitudinally of said vehicle at each side thereof, a carrier block having means mounted for slidable lengthwise movement along said rod, said member being mounted on said block, two groups of lock washers on said rod and carried by said block for movement therewith, and means for tilting the washers of respective groups in opposite directions to interlock with said rod and for moving said washers to parallel position to permit said block to slide along said rod.

* * * * *